United States Patent [19]
Kinoshita et al.

[11] Patent Number: 5,426,289
[45] Date of Patent: Jun. 20, 1995

[54] COLOR CODE

[75] Inventors: Takahito Kinoshita, Uozu; Isao Tabayashi, Kuki; Manabu Shimohata, Kanazawa, all of Japan

[73] Assignee: Dainippon Ink and Chemicals, Inc., Tokyo, Japan

[21] Appl. No.: 126,167

[22] Filed: Sep. 24, 1993

[30] Foreign Application Priority Data

Sep. 28, 1992 [JP] Japan .................................. 4-257732

[51] Int. Cl.⁶ ............................................. G06K 7/12
[52] U.S. Cl. .................................. 235/469; 235/494
[58] Field of Search ............................ 235/469, 494

[56] References Cited

U.S. PATENT DOCUMENTS

| | | | |
|---|---|---|---|
| 3,176,141 | 3/1965 | Siegemund | 235/469 |
| 3,206,592 | 9/1965 | Nadler | 235/469 |
| 3,471,684 | 10/1969 | Berezov | 235/469 |
| 3,835,297 | 9/1974 | Inoue et al. | 235/469 |
| 4,204,639 | 5/1980 | Barber et al. | |
| 4,526,404 | 7/1985 | Vasquez | |
| 4,824,144 | 4/1989 | Tasma | |
| 4,846,503 | 7/1989 | Strauss | |
| 4,874,936 | 10/1989 | Chandler et al. | 235/494 |
| 4,889,367 | 12/1989 | Miller | |

FOREIGN PATENT DOCUMENTS

| | | |
|---|---|---|
| 51-29382 | 8/1976 | Japan |
| 60-49473 | 3/1985 | Japan |
| 63-278189 | 11/1988 | Japan |
| 2-144683 | 6/1990 | Japan |

*Primary Examiner*—Harold Pitts
*Attorney, Agent, or Firm*—Armstrong, Westerman, Hattori, McLeland & Naughton

[57] ABSTRACT

The present invention provides a color code for displaying information using an arranged combination of a plurality of color phase marks wherein the color code includes a plurality of column marks arranged at uniform intervals, and a plurality of color phase marks arranged around the periphery of each of the aforementioned plurality of column marks using each of the plurality of column marks as a reference. In order to read out the color code, initially, a column mark is read out, and after its arrangement has been determined, the color phase marks arranged at predetermined positions around the periphery of the column mark are read out. The codes, i.e. data, are then obtained by referencing combinations of color phases of the color phase marks read out with a predetermined color code table.

7 Claims, 17 Drawing Sheets

LEGEND

☐ : COLOR PHASE MARK 302

■ : COLUMN MARK 202

---▶ : STRAIGHT LINE TO SUBSEQUENT COLUMN MARK

| LETTER | COLOR PHASE | USAGE INK COMPOSITION |
|---|---|---|
| A | DIRECT YELLOW 132 | DYE |
| B | DIRECT RED 236 | DYE |
| C | DIRECT BLUE 199 | DYE |
| D | DIRECT BROWN 44 | DYE |
| E | DIRECT RED 238 | DYE |
| COLUMN MARK | DIRECT BLACK 19 | DYE |

$R_1 = 1.4 \quad R_2 = 2 \quad R_3 = 2.6 \text{(mm)}$ $\theta = 90°, 270°$

FIG.8

| | COLOR PHASE COMBINATION | CORRESPOND-ING CODE |
|---|---|---|
| A-A | DIRECT YELLOW 132 → DIRECT YELLOW 132 | START CODE |
| A-B | DIRECT YELLOW 132 → DIRECT RED 236 | END CODE |
| A-C | DIRECT YELLOW 132 → DIRECT BLUE 199 | 0 |
| A-D | DIRECT YELLOW 132 → DIRECT BROWN 44 | 1 |
| A-E | DIRECT YELLOW 132 → DIRECT RED 238 | 2 |
| B-A | DIRECT RED 236 → DIRECT YELLOW 132 | 3 |
| B-B | DIRECT RED 236 → DIRECT RED 236 | 4 |
| B-C | DIRECT RED 236 → DIRECT BLUE 199 | 5 |
| B-D | DIRECT RED 236 → DIRECT BROWN 44 | 6 |
| B-E | DIRECT RED 236 → DIRECT RED 238 | 7 |
| C-A | DIRECT BLUE 199 → DIRECT YELLOW 132 | 8 |
| C-B | DIRECT BLUE 199 → DIRECT RED 236 | 9 |
| C-C | DIRECT BLUE 199 → DIRECT BLUE 199 | A |
| C-D | DIRECT BLUE 199 → DIRECT BROWN 44 | B |
| C-E | DIRECT BLUE 199 → DIRECT RED 238 | C |
| D-A | DIRECT BROWN 44 → DIRECT YELLOW 132 | D |
| D-B | DIRECT BROWN 44 → DIRECT RED 236 | E |
| D-C | DIRECT BROWN 44 → DIRECT BLUE 199 | F |
| D-D | DIRECT BROWN 44 → DIRECT BROWN 44 | G |
| D-E | DIRECT BROWN 44 → DIRECT RED 238 | H |
| E-A | DIRECT RED 238 → DIRECT YELLOW 132 | I |
| E-B | DIRECT RED 238 → DIRECT RED 236 | J |
| E-C | DIRECT RED 238 → DIRECT BLUE 199 | K |
| E-D | DIRECT RED 238 → DIRECT BROWN 44 | L |
| E-E | DIRECT RED 238 → DIRECT RED 238 | M |

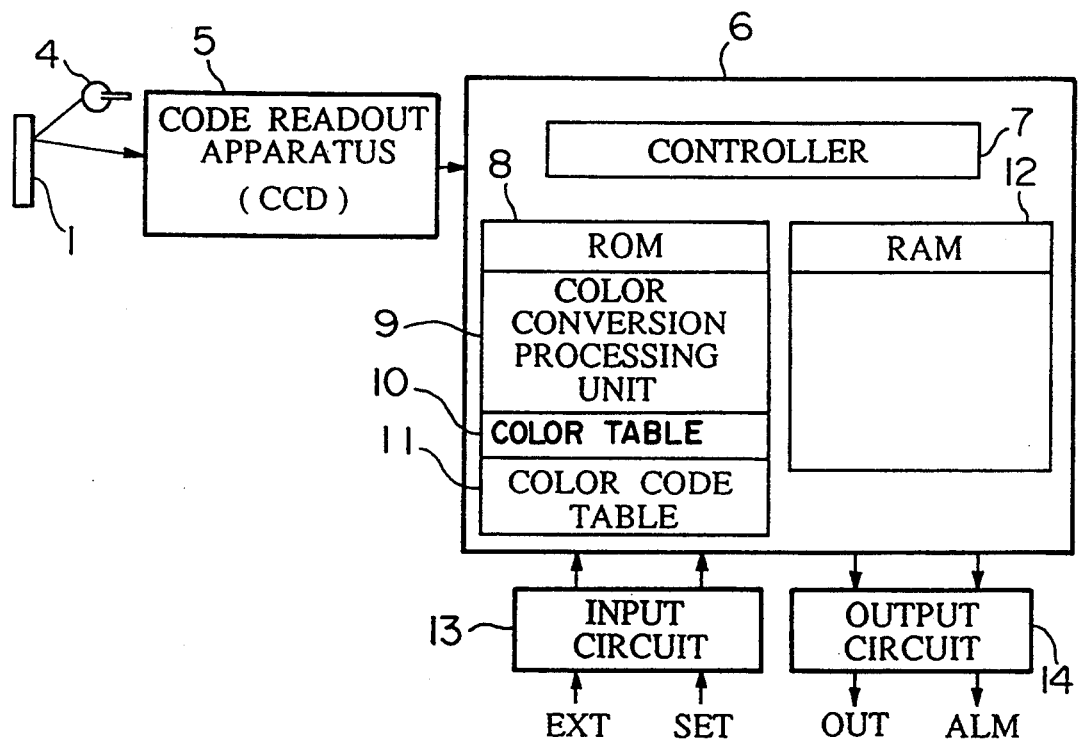
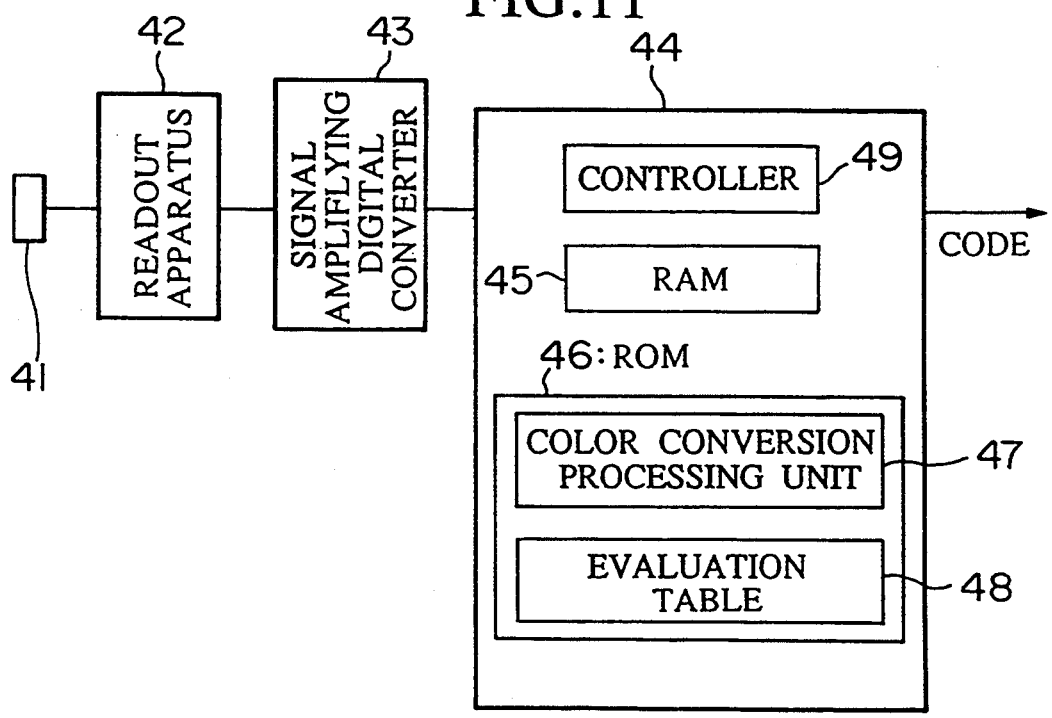

FIG.14

| COLOR | | $a_0$ | $b_0$ | COLOR DISTANCE $\Delta D$ $=(\Delta a^2+\Delta b^2)^{1/2}$ | | | | | | |
|---|---|---|---|---|---|---|---|---|---|---|
| | | | | | 2 | 3 | 4 | 5 | 6 | 7 |
| 1. YELLOW | | -7.37 | 45.14 | | 42.5 | 45.8 | 43.2 | 37.0 | 26.8 | 32.0 |
| 2. MAGENTA | | 45.65 | 0.97 | | | 69.0 | 84.0 | 48.8 | 35.1 | 73.3 |
| 3. CYANOGEN | | -9.84 | -38.83 | | | | 68.3 | 21.4 | 71.4 | 39.0 |
| 4. YELLOW + MAGENTA | | 33.57 | 18.61 | | | | | 72.0 | 55.3 | 29.6 |
| 5. YELLOW + CYANOGEN | | -24.44 | 14.47 | | | | | | 58.2 | 46.4 |
| 6. MAGENTA + CYANOGEN | | 16.01 | -24.38 | | | | | | | 56.1 |
| 7. BLACK | | 5.02 | -0.80 | | | | | | | |

| DYE | a₀ | b₀ | COLOR DISTANCE $\Delta D = (\Delta a^2 + \Delta b^2)^{1/2}$ | | | | | | | |
|---|---|---|---|---|---|---|---|---|---|---|
| | | | 2 | 3 | 4 | 5 | 6 | 7 | 8 | 9 |
| 1. DIRECT YELLOW 132 | -4.07 | 47.76 | 35.9 | 54.8 | 72.5 | 82.3 | 76.0 | 77.8 | 33.9 | 49.5 |
| 2. DIRECT ORENGE 15 | 26.78 | 30.56 | | 19.5 | 41.9 | 56.0 | 61.7 | 71.4 | 16.7 | 42.0 |
| 3. DIRECT RED 236 | 40.28 | 16.47 | | | 25.5 | 41.9 | 55.8 | 69.3 | 26.3 | 44.3 |
| 4. DIRECT RED 238 | 40.34 | -9.04 | | | | 17.2 | 39.0 | 55.7 | 38.8 | 41.3 |
| 5. DIRECT VIOLET 51 | 33.81 | -24.96 | | | | | 28.0 | 45.4 | 48.7 | 41.3 |
| 6. DIRECT BLUE 1 | 5.97 | -27.53 | | | | | | 17.5 | 47.8 | 26.7 |
| 7. DIRECT BLUE 199 | -11.37 | -29.75 | | | | | | | 55.5 | 30.3 |
| 8. DIRECT BROWN 44 | 14.17 | 19.55 | | | | | | | | 25.6 |
| 9. DIRECT BLACK 19 | -0.23 | -1.56 | | | | | | | | |

FIG.18

| INK | BEFORE DISCOLORATION | | AFTER DISCOLORATION | |
|---|---|---|---|---|
| | a | b | a | b |
| 1. WHITE | -0.09 | 3.24 | -0.57 | 5.72 |
| 2. YELLOW | -7.37 | 45.14 | -3.92 | 38.10 |
| 3. MAGENTA | 45.65 | 0.97 | 32.39 | 0.71 |
| 4. CYANOGEN | -9.84 | -38.83 | -9.27 | -31.65 |
| 5. YELLOW + MAGENTA | 33.57 | 18.61 | 23.44 | 16.81 |
| 6. YELLOW + CYANOGEN | -24.44 | 14.47 | -18.31 | 8.44 |
| 7. MAGENTA + CYANOGEN | 16.01 | -24.38 | 8.58 | -20.10 |
| 8. BLACK | 5.02 | -0.80 | 6.45 | 0.98 |

FIG.19

| INK | 2 | 3 | 4 | 5 | 6 | 7 | 8 |
|---|---|---|---|---|---|---|---|
| 1 | 42.5 | 45.8 | 43.2 | 37.0 | 26.8 | 32.0 | 6.5 |
| 2 |  | 69.0 | 84.0 | 48.8 | 35.1 | 73.3 | 47.6 |
| 3 |  |  | 68.3 | 21.4 | 71.4 | 39.0 | 40.7 |
| 4 |  |  |  | 72.0 | 55.3 | 29.6 | 40.8 |
| 5 |  |  |  |  | 58.2 | 46.4 | 34.5 |
| 6 |  |  |  |  |  | 56.1 | 33.2 |
| 7 |  |  |  |  |  |  | 26.0 |

FIG.20

| INK | 2 | 3 | 4 | 5 | 6 | 7 | 8 |
|---|---|---|---|---|---|---|---|
| 1 | 32.6 | 33.3 | 38.4 | 26.4 | 17.9 | 27.4 | 8.5 |
| 2 |  | 52.1 | 70.0 | 34.7 | 33.0 | 59.5 | 38.5 |
| 3 |  |  | 52.8 | 18.4 | 51.3 | 31.6 | 25.9 |
| 4 |  |  |  | 58.5 | 41.1 | 21.3 | 36.2 |
| 5 |  |  |  |  | 42.6 | 39.8 | 23.2 |
| 6 |  |  |  |  |  | 39.2 | 25.9 |
| 7 |  |  |  |  |  |  | 21.2 |

FIG.21

| DYE | | |
|---|---|---|
| 1. DIRECT YELLOW 11 | 5.68 | 43.51 |
| 2. DIRECT YELLOW 139 | 12.20 | 44.37 |
| 3. DIRECT ORENGE 15 | 26.78 | 30.56 |
| 4. DIRECT ORENGE 118 | 36.33 | 28.19 |
| 5. DIRECT RED 255 | 41.17 | 16.88 |
| 6. DIRECT RED 236 | 40.28 | 16.47 |
| 7. DIRECT RED 238 | 40.34 | -9.04 |
| 8. DIRECT VIOLET 51 | 33.81 | -24.96 |
| 9. DIRECT BLUE 1 | 5.97 | -27.53 |
| 10. DIRECT BLUE 15 | 4.03 | -24.66 |

FIG.22

| DYE | 2 | 3 | 4 | 5 | 6 | 7 | 8 | 9 | 10 |
|---|---|---|---|---|---|---|---|---|---|
| 1 | 6.6 | 24.8 | 34.3 | 44.4 | 43.9 | 63.0 | 74.0 | 71.0 | 68.2 |
| 2 | | 20.1 | 29.1 | 39.9 | 39.6 | 60.4 | 72.6 | 72.2 | 69.5 |
| 3 | | | 9.8 | 19.9 | 19.5 | 41.9 | 56.0 | 61.7 | 59.7 |
| 4 | | | | 12.3 | 12.4 | 37.4 | 53.2 | 63.5 | 61.9 |
| 5 | | | | | [1.0] | 25.9 | 42.5 | 56.7 | 55.7 |
| 6 | | | | | | 25.5 | 41.9 | 55.8 | 54.8 |
| 7 | | | | | | | 17.2 | 39.0 | 39.5 |
| 8 | | | | | | | | 28.0 | 29.8 |
| 9 | | | | | | | | | [3.5] |

☐ : $\Delta \leq 5$

COLOR CODE

BACKGROUND OF THE INVENTION

1. Field of the Invention

The present invention relates to a color code formed by arranging a plurality of color phases.

2. Prior Art

From the prior art, inventions such as optical character reader (OCR), optical mark reader (OMR) and bar code reader are known which read out black-colored characters and symbols, recognizing these letters and symbols from their line width and line spacing.

However, in the case when a color other than black or when a plurality of colors are mixed, the read out becomes imprecise. In addition, when the substrate onto which the code will be printed is a stretchable material, for example, linen products such as towels and the like, expansion or shrinkage of the line width and line spacing occurs such that this code cannot be applied to such substrates.

Furthermore, recently, because codes are being used in a number of different fields, the amount of information to be calculated has dramatically increased. With this dramatic increase in the amount of information, there has been a corresponding shortage in the number of columns of a code.

In an effort to solve this problem concerning the shortage in the number of columns of a code, a method for increasing the amount of information by providing a plurality of color phases other than black to a bar code is stated in Japanese Patent Application, First Publication No. Hei 2-144683. Additionally, a Vorbox code is disclosed in Japanese Patent Application, First Publication No. Sho 63-278189.

However, the increasing the amount of information by providing color phases to a bar code, as with the normal black-colored bar code, cannot be applied to substrates which stretch such as linen products e.g. towels and the like.

In addition, with regard to the Vorbox code, there exist limits to the forms of the code itself, as well as problems in that this code cannot be applied to substrates which stretch over a certain value.

In a color code which utilizes color phases other than black and possesses an increased amount of information, it is an objective of the present invention to solve the aforementioned problems and to achieve a color code which can precisely and correctly read out codes (data) even in the case when applied to substrates which stretch such as linen products and the like.

SUMMARY OF THE INVENTION

In a color code which displays information using an arranged combination of a plurality of color phases, the color code of the present invention is characterized in comprising a plurality of column marks arranged at uniform intervals and color phase marks arranged at the periphery of the aforementioned column marks using each respective column mark as a reference.

The present invention employs a structure which forms a color code by arranging one-dimensionally or two-dimensionally, using column marks as the origins, a plurality of color phase marks in arbitrary size area. This structure verifies combinations of color phases, detected from the color phase marks by means of reflected or transmitted light, with preset color tables and color code tables, and then converts them into codes (data).

According to the present invention, a code (data) can be read out correctly even when printing the color code on a stretchable material (substrate) such as linen products, rubber products and the like.

According to the color code of the present invention, it is also possible to apply the color code itself to designed characters, symbols and marks.

BRIEF DESCRIPTION OF THE DRAWINGS

FIG. 8 shows a color code table according to an embodiment of the present invention.

FIG. 10 is a structural diagram showing a system for reading out a color code according to the present invention.

FIG. 11 is a structural diagram showing another embodiment of a system for reading out a color code according to the present invention.

FIG. 14 shows colorimetric data (base recognition data) of various color printing regions.

FIG. 15 shows colorimetric data (base recognition data) of various color printing regions.

FIG. 18 shows colorimetric data of various color printing regions.

FIG. 19 shows the color distances between each of the aforementioned color printing regions.

FIG. 20 shows the color distances between each of the aforementioned color printing regions after discoloration.

FIG. 21 shows colorimetric data of various color printing regions.

FIG. 22 shows the color distances between each of these color printing regions.

DETAILED DESCRIPTION OF THE PREFERRED EMBODIMENTS

Figure 1:
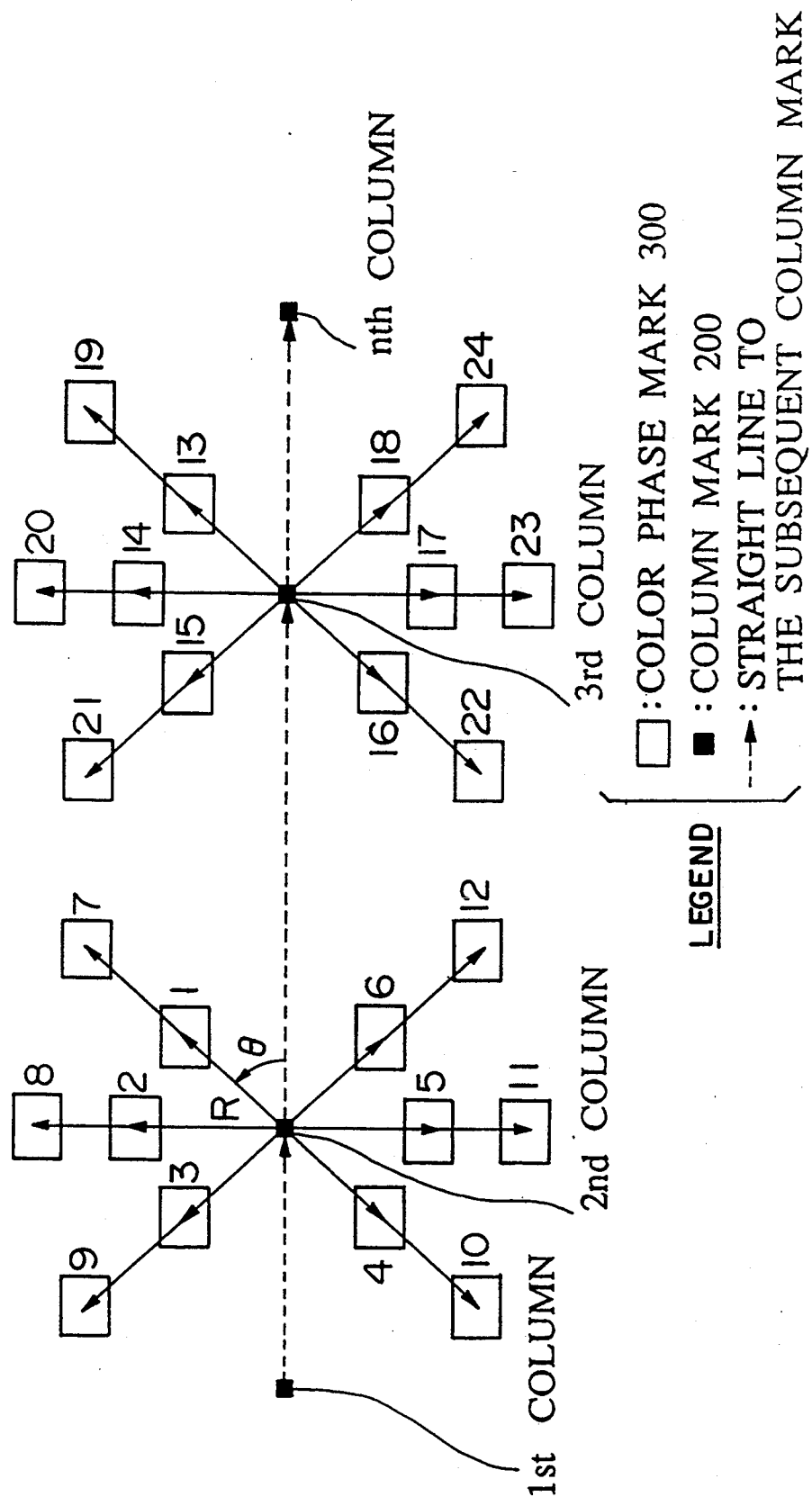
FIG. 1 shows a structural view of an embodiment of the present invention.

In FIG. 1 a color code according to an embodiment of the present invention is shown. This color code shown in FIG. 1 is constructed using a plurality of column marks 200 and a plurality of color phase marks 300. An n number of these plurality of column marks 200 are arranged in a straight line (one-dimensional). In addition, in the interval from the second column to the (n−1) column of these column marks 200, 12 color phase marks 300 are arranged respectively around each column mark 200.

As in this embodiment, in the case when column marks 200 are arranged in a straight line, all of the columns with the exception of the first (head) and the nth (end) columns, i.e. the 2nd through (n−1) columns each respectively serve as origins around which color phase marks 300 are one-dimensionally or two-dimensionally arranged.

In addition, each line segment connecting two column marks 200 serves as a baseline. Color marks 300 are arranged, by means of printing, within a predetermined range of positions at a predetermined distance R from each origin, and form an angle $\theta$ with the baseline.

Color phase mark 300 represents a color phase printed within this predetermined range, and this color phase, in turn, corresponds to a combination of codes (data). In this embodiment, these color phases are presented in pairs, i.e. two color phases correspond to a code preset into a color code table such as that shown in FIG. 8 (to be mentioned hereafter). Furthermore, a combination of the same color phase is also included in this combination of two color phases.

The following rules apply to the color code shown in FIG. 1.

(1) Column marks 200 "■" are arranged in a straight line, separated at uniform intervals as shown by the 1st column, 2nd column, 3rd column . . . nth column in the figure.

(2) Color phase marks 300 are not arranged around the 1st column of these column marks 200.

(3) From among these column marks 200, the line segment connecting the 2nd and 3rd columns serves initially as the baseline. Additionally, the position of the 2nd column mark 200 serves as the origin.

(4) The area of a predetermined range, employing as its center a point which is separated a distance R from the origin and forming an angle $\theta$ with the baseline, is denoted by a rectangle "□" and represents the printing range of a color phase mark 300. In this embodiment, the printing range of color phase marks 300 is designated by the rectangles "□" which employ as their centers, six points forming angles $\theta$ of 45°, 90°, 135°, 225°, 270° and 315° with the baseline. Furthermore, the readout order is as shown in FIG. 1, proceeding from 1 to 6.

In the same manner, a predetermined range centered around a point separated a distance 2R from the origin and forming an angle $\theta$ with the baseline, is designated as a printing range. In FIG. 1, this range is expressed by numerals 7 through 12. These numerals 7~12 also indicate the readout order.

With regard to these color phase marks 1 to 6 and 7 to 12, pairs of color phases corresponding to codes (data) preset into the color code table (to be mentioned hereafter) are accordingly printed in order. Consequently, from within this range of 1~12, a total of six data are designed to be printed based on the color phases.

(5) Subsequently, the line segment joining the 3rd and 4th column marks 200 serves as the baseline. Furthermore, the position of the 3rd column mark 200 is designated as the origin, and the process explained in (4) above is repeated. Similarly, in this case, with regard to a total of 6 codes (data), 12 color phase marks 300 are printed.

This process is repeated until the (n-1) column mark 200 is reached, with each column mark therein serving as an origin.

In the aforementioned manner, the color code of the present embodiment shown in FIG. 1 is formed by arranging a plurality of column marks 200 in a straight line (one-dimensional), and then repeating a process in which each column mark 200 from the 2nd column to the (n1) column serves as an origin and each line segment connecting successive origins therein serves as a baseline wherein color phase marks 300, possessing a predetermined area centered around a point separated a distance R from the origin and forming an angle $\theta$ with the baseline, are printed.

When reading out this color code, the point calculated from the origin and baseline, as well as the color phase marks in the vicinity are read out in order, and are identified as significant codes (data) only when the color phases preset into the color code table occur in pairs. In this manner, even when the substrate onto which the color code is printed is a stretchable material such as a linen product, the color phase can be correctly read out. In addition, when the read out pair of color phases is not preset into the color code table, recognition of a significant code (data) is not made, and thus precise read out of the correct code (data) becomes possible.

Figure 2:
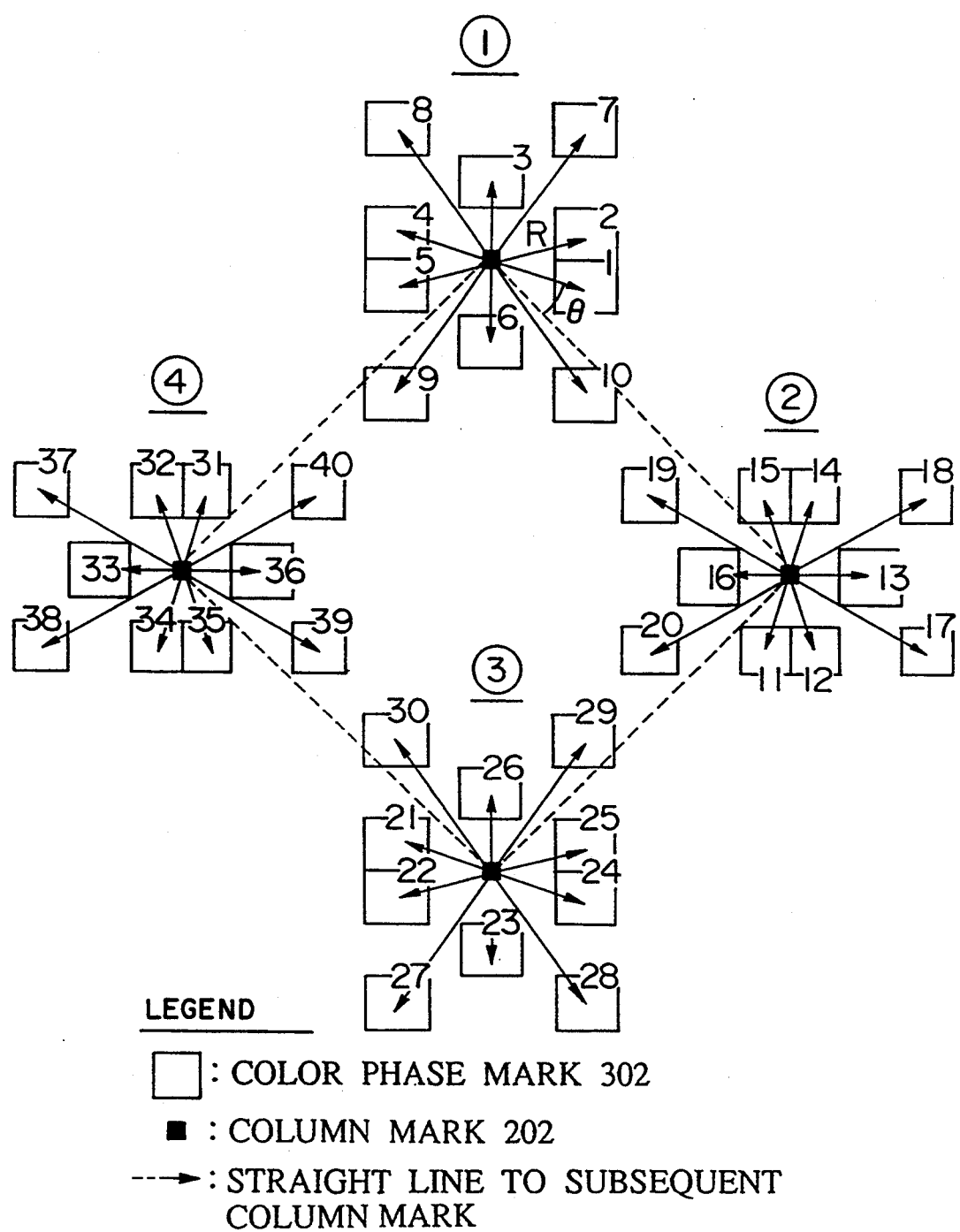
FIG. 2 shows a structural view of another embodiment of the present invention.

FIG. 2 is a structural diagram showing another embodiment of the present invention.

In this figure, 4 column marks 202 are arranged two-dimensionally in the same plane with 10 color phase marks 302 arranged respectively around each column mark 202. In the following, color code of the present embodiment shown in FIG. 2 will be explained.

(1) The 4 column marks 202 "■" are arranged two-dimensionally at the corners of a rectangle.

(2) The line segment connecting an arbitrary column mark 202 (①) to another column mark 202 (②) is designated as the baseline, and column mark 202 (①) serves as the origin.

(3) The area of a predetermined range, employing as its center a point which is separated a distance R from the origin and forming an angle $\theta$ with the baseline, is denoted by a rectangle "□" and represents the printing range of a color phase mark 302. This range is expressed by numerals 1 through 6 in FIG. 2. In addition, these numerals also indicate the readout order. Furthermore, on the exterior of color phase marks 1~6, a range comprising 4 areas numbered 7 to 10, indicating the readout order, is also provided. In the range indicated by the aforementioned color phase marks 1~6 and 7~10, pairs of color phases corresponding to codes (data) preset into the color code table (to be mentioned hereafter) are printed in order.

Consequently, from within this range of 1~10, a total of 5 codes (data) are designed to be printed based on the color phases.

(4) In the same manner, as shown in the figure, 10 color phase marks 302 are formed around each of the other column marks 202 (②), (③), and (④).

In the above-mentioned manner, the color code shown in FIG. 2 is formed by arranging a plurality of column marks 202 (in this embodiment, these column marks are arranged at the corners of a rectangle), and then printing the respective color phase marks 302 each possessing a predetermined area centered around a point separated a distance R from each origin and forming an angle $\theta$ with each baseline.

When reading out this color code, the point calculated from the origin and baseline, as well as the color phase marks in the vicinity are read out in order (averages, as well as proportions of color phases are abundant), and are identified as significant codes (data) only when the color phases preset into the color code table occur in pairs. In this manner, even when the substrate onto which the color code is printed is a stretchable material such as a linen product, the color phase can be correctly read out. In addition, when the read out pair of color phases is not preset into the color code table, recognition of a significant code (data) is not made, and thus precise read out of the correct code (data) becomes possible.

Furthermore, column codes 200 are arranged one-dimensionally (in a straight line) in the color code shown in FIG. 1, and the corresponding column codes 202 are arranged two-dimensionally (at the corners of a rectangle) in the color code shown in FIG. 2, however, the present invention is not limited to the aforementioned, as the color code can be formed by optionally arranging the column codes in any easily recognizable pattern, and then printing in order using a pair of color phases corresponding 1 code (data), each color phase possessing a predetermined range centered around a point at a predetermined position.

According to the present embodiment, even when printing the color code onto stretchable substrates such as linen products, as long as the degree of stretching lies near a center within a predetermined range, the color phase can be precisely read out. Furthermore, in the case of a color phase which has been altered by the original color phase of the substrate, when a pair of color phases that is not registered into the color code table is read out, recognition of a significant code (data) is not made, and thus precise read out of the correct code (data) becomes possible. In particular, errors can be prevented by excluding color phases which are altered by the original color or cloth of a substrate.

Figure 3:
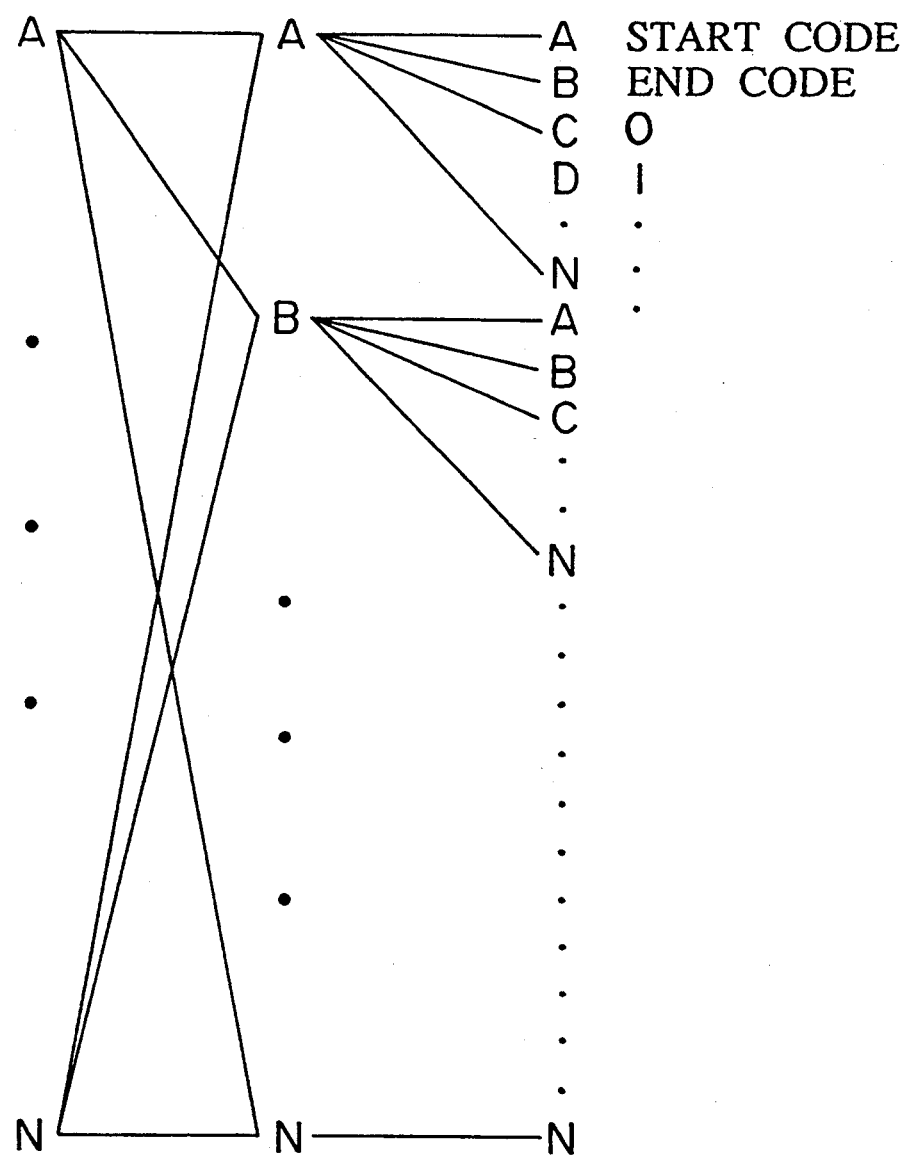
FIG. 3 shows an example of combinations of color phases.

FIG. 3 shows an example of combinations of color phases according to the present invention. In FIG. 3, A, B, C . . . N each represent a different color phase. A code (data) is expressed by combining 3 color phases (including combinations of three identical color phases), for example:

|         |            |
| ------- | ---------- |
| A-A-A:  | Start mark |
| A-A-B:  | End mark   |
| A-A-C:  | 0          |
| A-A-D:  | 1          |
| A-A-E:  | 2          |
| .       | .          |
| .       | .          |
| .       | .          |
| A-A-N:  | N-3        |

The example above employs combinations of 3 color phases, however, combinations of 2 and/or 4 or more are also possible.

In the following, the operations at the time of reading out the color code printed onto a substrate will be sequentially explained in detail according to the flow chart shown in FIG. 4.

Figure 4:
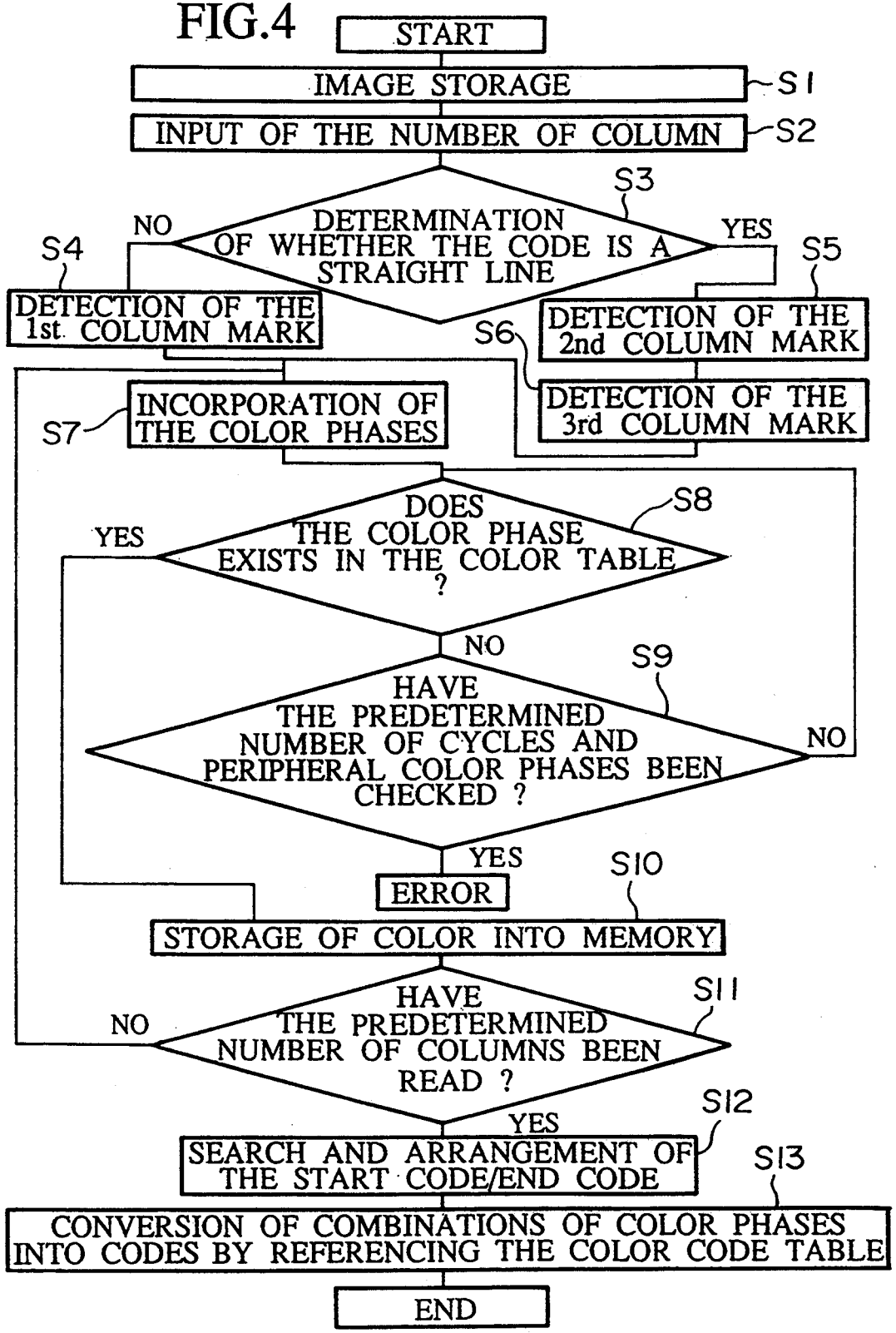
FIG. 4 shows a readout flow chart for reading out color codes of the present invention.

In step S1 shown in FIG. 4, the image of the color code read out from the substrate is stored in memory. In step S2, the number of columns of this color code is inputted. In step S3, a decision is made as to whether this code is a straight line or not. In other words, a decision is made as to whether the color code is a straight line such as that shown in FIG. 1, or forms a shape other than a straight line such as in FIG. 2 (a rectangle).

When a decision is made that this color code is a straight line as shown in FIG. 1, the decision result is YES: because there are no color phase marks 300 around the periphery of the 1st column mark forming this color code, the process moves to step S5 and detects the 2nd column mark 200. Subsequently in step S6, the 3rd column mark 200 is detected, and as stated before, after the origin and baseline are calculated, the color phases of the points (or vicinities therein) at which the color phase marks 300 therein exist are detected. In step S7, these color phases are then incorporated.

On the other hand, when it is determined in step S3 that a straight line does not exist as shown in FIG. 2, the above decision result is NO. Consequently, origins and baselines are calculated for both the 1st and 2nd column marks 202 forming the color code, the color phases of the points (or vicinities therein) at which the color phase marks 302 therein exist are detected, and in step S7, these color phases are all incorporated.

In step S8, a decision is made as to whether or not the incorporated color phases are present in the color table. When the color phase exists in the color table and a decision is made that the color phase was used in the color code, the decision result is YES and the process moves to step S10.

On the other hand, when it is determined that the color phase was not used in the color code, the above decision result is NO, and the process moves to step S9.

In step S9, a decision is made as to whether or not the predetermined number of cycles and peripheral color phases have been checked. When this result is YES, determination of an error is made. In contrast, when the above result is NO, step S8 is repeated again with regard to 1 peripheral color phase (for example, the color phase positioned at "■" in FIG. 6(b), to be explained hereafter).

Figures 6A, 6B, 6C, 6D:
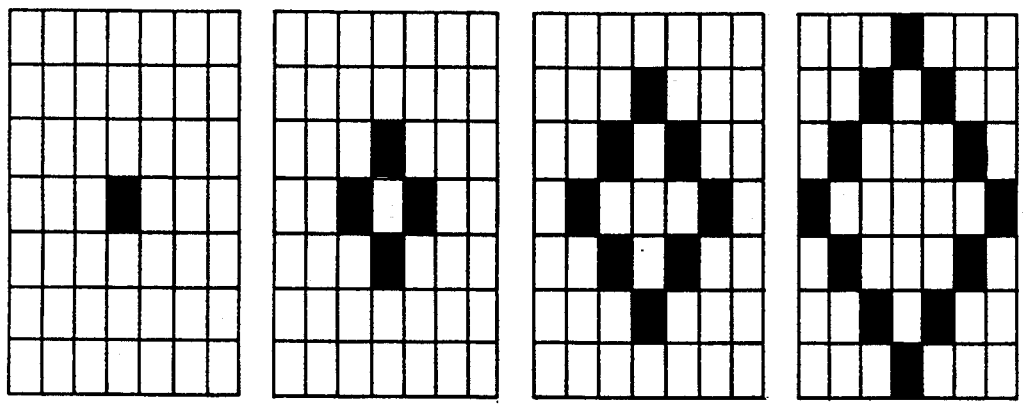
FIGS. 6(A) to 6(D) are diagrams describing the readout of a color phase mark of a color code.

In this manner, when the original color phase is not detected due to noise created by stretching of the substrate onto which the color code is printed or optical expansion of the color code, the color phases at the points around the periphery of the center point of the aforementioned color phase mark (such as the peripheral points shown in FIG. 6(b), (c) and (d)) are detected in order, and a determination of whether or not each color phase used in the color code is detected is repeated.

In step S10, when color phases used in the color code are detected from the predetermined positions around the column mark, these colors (color phases) are stored in order in memory.

In step S11, a decision is made as to whether or not the predetermined (the number of columns preset in step S2) number of columns has been read. If the aforementioned columns have been read, the above decision result is YES, the color phases of the color phase marks of the predetermined number of columns are detected, stored in memory, and the process moves to step S12. On the other hand, if the aforementioned columns have not been read, the above decision result is NO, and the steps after step S7 are repeated with regard to the subsequent number of column marks.

In step S12, the start and end marks are determined and arranged. In other words, up until a decision of YES results in step S11, the color phases of a predetermined number of columns are sequentially read out and stored in memory. From among this arrangement of color phases sequentially stored in memory, the first (beginning) and last (end) pairs of color phases are read out, the color code table is referenced, the start and end marks are determined and arranged such that the start mark occurs first and the end mark occurs last.

In step S13, the combinations of color phases are verified according to the color code table, and sequentially converted into codes (data).

By passing through the aforementioned steps, with regard to the straight line color code shown in FIG. 1 or the rectangular color code shown in FIG. 2, the origin and baseline are calculated based on the column mark, the color phases of the color phase marks at predetermined positions from said column mark are sequentially detected, correct color phases existing in the color table are determined and read out, and this arrangement of read out color phases is converted to codes (data) in accordance with the color code table.

According to this color code, even when the substrate onto which the color code is printed stretches, only correct color phases are read out: pairs of these color phases which are read out are then converted to codes (data). In addition, by removing in advance the color phases of the substrate cloth from the color table, the codes which are determined according to combinations from the color code table cannot be used, and thus precise readout is possible without being effected by the color phase of the substrate cloth.

Furthermore, detection of the color phases printed in the color code is conducted as follows.

Initially, light is irradiated onto the color code, and the reflected light or transmitted light is spectrally divided using a RGB filter. Each of the excitation values XYZ obtained by the spectral division is calculated, projected onto the two-dimensional plane of projection of a color specification system, and a color phase in the appropriate range is detected when a value occurs within a predetermined range.

As an example of the aforementioned color specification system, a Lab color specification system, which uniforms the values to approximately those colors perceived by the naked eye, can be used. Using the following formulae (1) and (2), a and b are calculated from the aforementioned excitation values XYZ and then projected onto the two-dimensional plane of projection of the Lab color specification system. Subsequently, when a, b fall within a predetermined range, they are determined to be color phases lying within a detectable range. This range for detecting the color phases will be explained hereafter.

$$a = 17.5(1.02X - Y)/Y^{\frac{1}{2}} \quad (1)$$

$$b = 7.0(Y - 0.847Z)/Y^{\frac{1}{2}} \quad (2)$$

Figure 5:
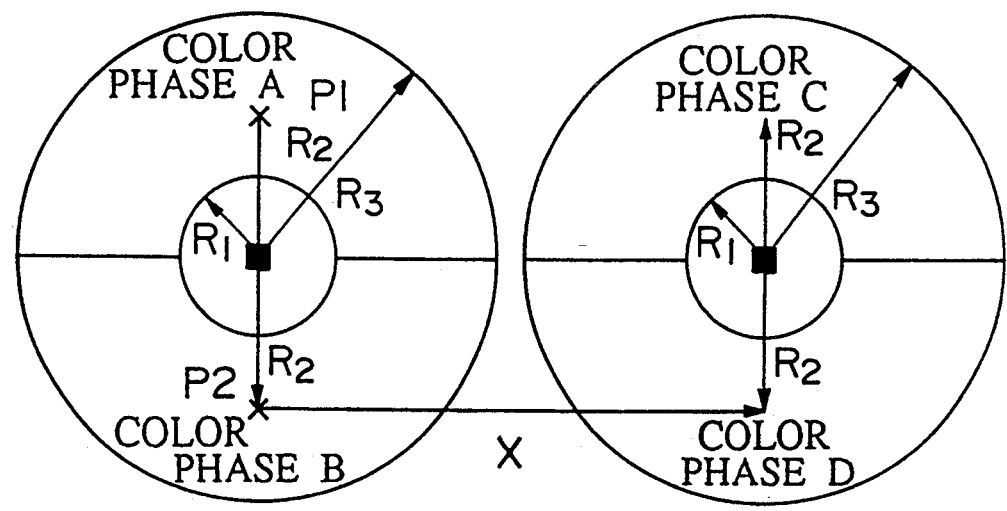
FIG. 5 shows a color code according to an embodiment of the present invention.

FIG. 5 is a diagram showing the readout of a color code according to the present embodiment.

This figure shows an example of the column code "■" and color phase mark in the case when the substrate onto which the color code is printed stretches. In this example, a combination of two color phase marks is arranged above and below a given column mark which is arranged in a straight line.

The distance $R_2$ of readout positions P1 and P2 from the origin are then calculated using the following formula.

$$R_2 = (R_3 - R_1)/2 + R_1$$

Angles $\theta$ with the base line are 90° and 270°.

In this manner, it is possible to precisely detect the color phase of the color phase mark even when the substrate stretches, bends slightly, or even when the spacing of the column marks is out of phase.

FIG. 6 is a diagram showing the readout of a color code according to the present invention. This figure describes a situation for detecting color phases when a color phase used in the aforementioned color code is not detected from the point where the color phase mark exists due to noise created by stretching or bending of the substrate onto which the color code is printed or expansion of the color code read out. Sequential detection of the predetermined number of cycles (only the predetermined amount in the peripheral range) and color phase is repeated with regard to whether or not points on the periphery which were used in the color code are detected.

FIG. 6(a) represents a first cycle which displays the state of a color phase that is not contained in the color table. In other words, a determination is made that the color phase of the color mark with center at position "■" is not registered in the color table, and is not a color phase used in the color code. At this point, the detection proceeds one step to the periphery of this color phase as shown in FIG. 6(b).

FIG. 6(b) is a second cycle which displays the state of color phases that are not contained in the color table. In other words, a determination is made that the color phases of the color marks at positions "■" on the 1× immediate periphery of the aforementioned color phase mark are not registered in the color table, and are not color phases used in the color code. Subsequently, the detection proceeds another step to the periphery of these color phases as shown in FIG. 6(c).

FIG. 6(c) is a third cycle which displays the state of color phases that are not contained in the color table. In other words, a determination is made that the color phases of the color marks at positions "■" on the 2× extended periphery of the aforementioned color phase mark are not registered in the color table, and are not color phases used in the color code. Subsequently, the detection proceeds a further step to the periphery of these color phases as shown in FIG. 6(d).

FIG. 6(d) is a fourth cycle which displays the state of color phases that are contained in the color table. In other words, a determination is made that the color phases of the color marks at positions "■" on the 3× extended periphery of the aforementioned color phase mark are registered in the color table, and thus are recognized as color phases used in the color code.

Consequently, readout errors of the color phase of a color mark caused by noise due to stretching or bending of the substrate onto which the color code is printed or optical expansion of the color code read out can be prevented.

Figures 7, 9:
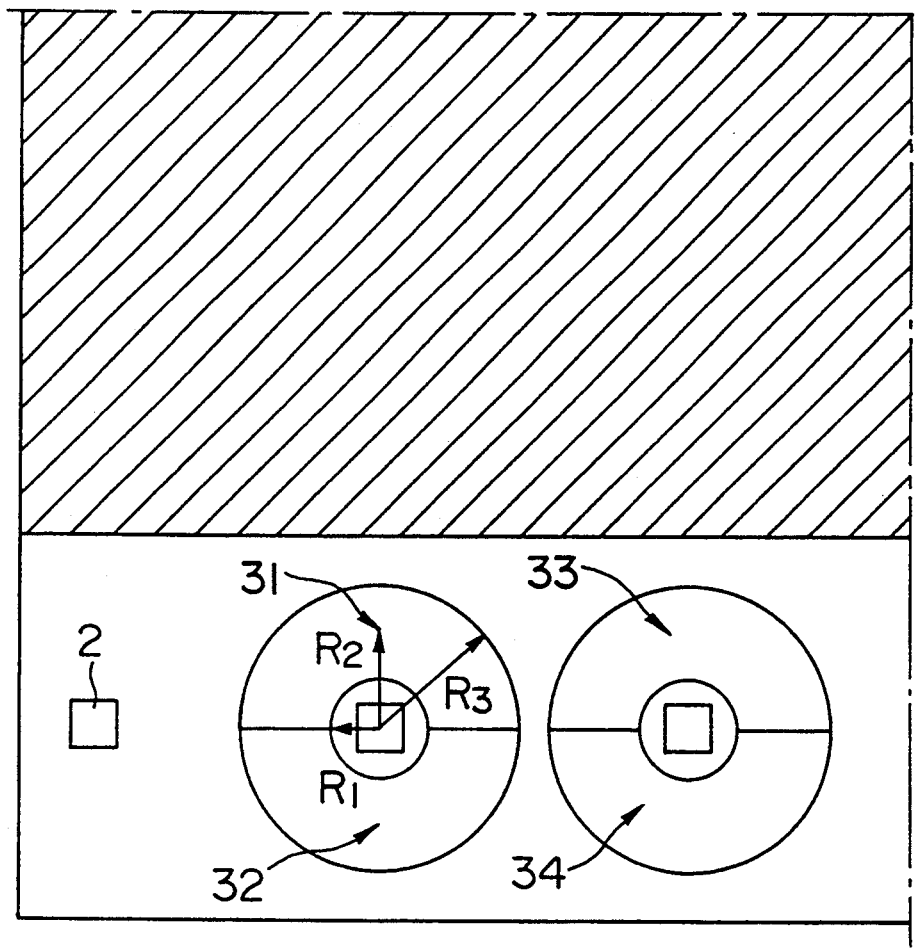
FIG. 7 shows a color table according to an embodiment of the present invention.
FIG. 9 shows a color code according to an embodiment of the present invention.

FIG. 7 shows an example of a color table according to the present invention. In this example, a total of 6 types of color phases are used: 5 types of color phases (A, B, C, D, E) are used as color phase marks, while the remaining color phase is used as a column mark.

The ink used in the present invention is not in particular limited as, for example, an ink can be used which is produced by combining 3% of various dyes, 5% of diethylene glycol with water as the remaining portion, agitating, and then filtering this mixture using a 0.5 μm membrane filter.

Further, all 6 types of color phase inks are registered in the color table, however, color phases which are confused with the color phase of the substrate cloth are excluded from the color table, and are not used as the color phase of a color code. The color phase of a color mark which is mistaken as the color phase of the cloth color is designed to not be detected as indicated by NO results in step S8 and S9 as shown in FIG. 4.

In addition, with regard to the aforementioned 6 color phases, color phases which are separated a significant distance from each other and are thus easily detectable by the the Lab color specification system are selected. This selection of color phases will be described in detail below.

FIG. 8 shows an example of a color code table according to the present invention. This color code table displays and registers the codes (data) of combinations of 2 color phases (including combinations of the same color phase) from the five types of color phases registered in the color table shown in FIG. 7. In FIG. 8, the characters A, B, C, D and E represent the same color phases as shown in FIG. 7.

For example, in the case of a color phase combination of direct yellow 132→direct yellow 132 (A—A), the corresponding code is displayed in FIG. 8 as the start code.

FIG. 9 shows a concrete example of the present invention in which the color code is directly printed by means of a ink jet printer onto the tip portion of the towel cloth using the 6 different types of inks indicated in FIG. 7. In this example, $R_1$, $R_2$, and $R_3$ are 1.4 mm, 2 mm, and 2.6 mm respectively, and the readout angles $\theta$ are 90° and 270°.

For example, the inks of A (direct yellow 132) and A (direct yellow 132) corresponding to the start codes and the inks of A (direct yellow 132) and D (direct brown 44) corresponding to "1" are printed respectively in a fan-shape using a jet ink printer onto color phase marks 31, 32 and color phase marks 33, 34, which serve as optional data. Optionally, the interior of column mark 2 "□" is printed with direct black 19 using the same ink jet printer.

An experiment was then conducted in which stress was forcibly applied to the above towel in numerous directions, and the color code was then read out while the towel was in a stretched state. The results show that precise, correct read out of the color code was possible, as will be explained in detail later.

In the following, the system structure and action at the time of reading out the color code of the present invention will be explained with reference to FIG. 10.

In FIG. 10, with regard to color code 1, the color code of the present invention is printed directly onto the towel cloth using a jet ink printer as shown in FIG. 9. Light source 4 irradiates light onto color code 1.

Code readout apparatus 5 reads out the image of color code 1 using the light reflected or transmitted from color code 1 created by means of the light from light source 4, and then converts this image into an image signal.

The image signal of color code 1 read out by code readout apparatus 5 is inputted, and then computer 6, formed from controller 7, ROM 8 and RAM 12, reads out this color code 1 and outputs the result.

Controller 7 performs general control over the entire computer 6. ROM 8 is formed from color conversion processing unit 9, color table 10 and color code table 11, and functions as a specialized readout memory for storing programs and data. Based on the image signal of color code 1, color conversion processing unit 9 converts colors of the column and color phase marks of color code 1 according to the procedure designated by step S3 to step S13 of FIG. 4, and reads out the codes therein. RAM 12 functions as memory with the ability to read-write, and stores data and the like.

Input circuit 13 inputs (EXT) various data from the exterior, and sets this data (SET). Output circuit 14 outputs the result (i.e. the readout code (data) of color code 1) (OUT), and also outputs the error information (ALM) of this result.

The actions of the aforementioned will now be explained.

Code readout apparatus 5 reads out the image of color code 1 using the light reflected or transmitted from color code 1 created by means of the light from light source 4, converts this image into an image signal, and inputs this converted image signal into computer 6.

Conversion processing unit 9 checks this image signal inputted from code readout apparatus 5 with color table 10 and color code table 11 according to the procedure designated by step S3 to step S13 of FIG. 4, and converts this image signal into codes (data). The converted code is then outputted to the exterior from the OUT of output circuit 14.

In addition, the color code readout device may also possess the structure shown in FIG. 11.

In FIG. 11, readout apparatus 42 spectrally divides the reflected light or transmitted light from color code 41 using an RGB filter, reads out the aforementioned color code 41, and produces the XYZ excitation values.

Signal amplifying digital converter 43 converts the signal of the analog, which is spectrally divided and readout by readout apparatus 42, into a digital value. The XYZ digital excitation values are also produced at this point.

The XYZ excitation values which are read out, spectrally divided and digitally converted from color code 41 by means of signal amplifying digital converter 43, are inputted and then computer 44, comprising RAM 45, ROM 46 and controller 49, reads out the color of color code 41.

RAM 45 is a memory with read-write capabilities which stores data and the like. ROM 46 is formed from color conversion processing unit 47 and evaluation table 48, and functions as a special readout memory for storing programs, data and the like.

Color conversion processing unit 47 performs color conversion based on the XYZ excitation values inputted from signal amplifying digital converter 43, and calculates the position of the two-dimensional plane of projection of the color specification system.

The color values of color code 41 are previously registered in evaluation table 48, for example, the a and b values of the Lab color specification system are previously measured and preset into this table. Controller 49 performs general control over the entire computer 44.

The Detection Range of the Color Phases

Figure 12:
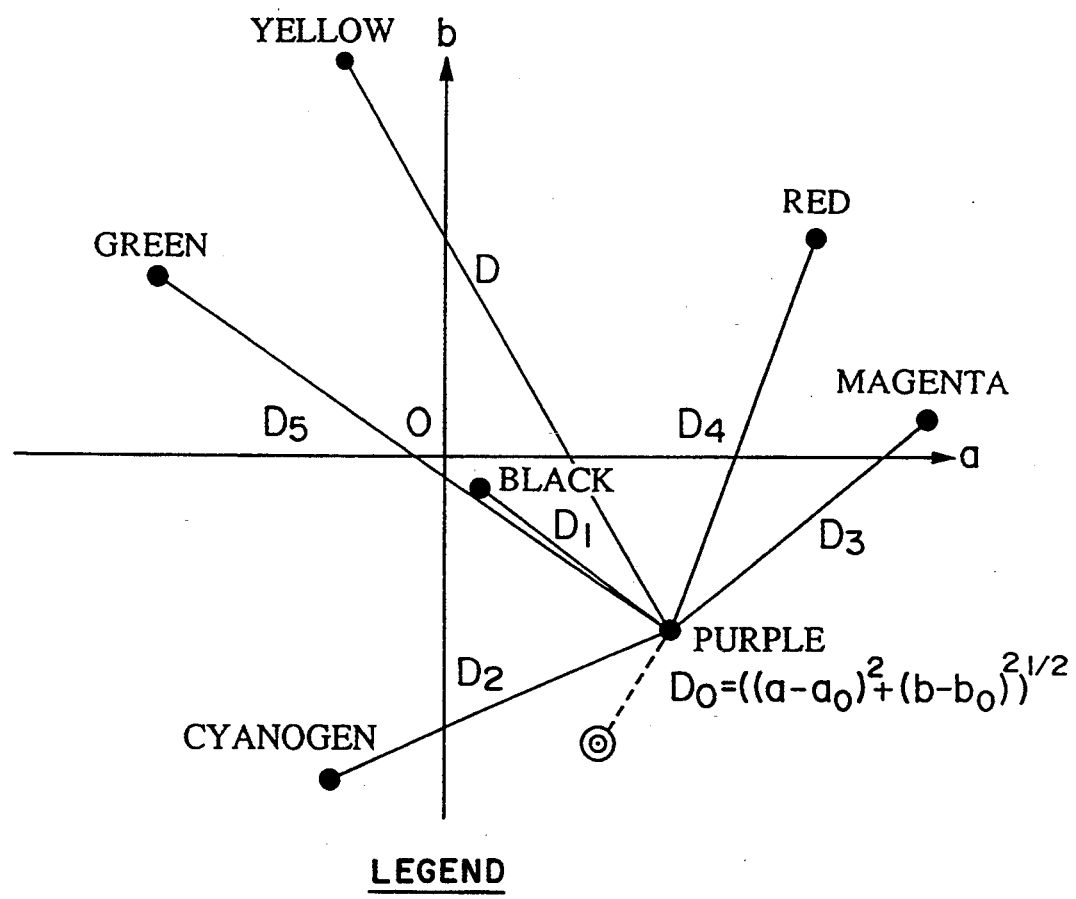
FIG. 12 is a relational graph showing the colors of a Lab color specification system.

FIG. 12 is a relational graph showing the colors of a Lab color specification system. This Lab color specification system is a color specification system expressing a brightness L, and a two-dimensional plane of projection by means of coordinate axes a and b, which conforms to the sensations observed by the human eye, and expresses the angle and saturation of a color phase using a radial distance. The values for a and b are calculated from the XYZ excitation values, obtained by spectrally dividing the reflected or transmitted light from the color code using an RGB filter, using the aforementioned formulae (1) and (2) respectively.

In the above Lab color specification system shown in FIG. 12, the base data of each color printing region is denoted by the symbol "●". In the figure, these correspond to the positions of black, cyanogen, magenta, red, green and yellow.

In the case when the color to be used in the color code is black, cyanogen, magenta, red, green and/or yellow, the values of a and b are calculated in the aforementioned formulae (1) and (2), from the XYZ excitation values read out from the color code and spectrally divided using an RGB filter. When the values of a and b correspond to a position indicated by "⓪" on the Lab color specification system shown in FIG. 12, this position "⓪", and the color distance $\Delta D_0$ from, in this case, purple ($a_0$, $b_0$) are calculated using the formula below.

$$\Delta D_0 = ((a-a_0)^2 + (b-b_0)^2)^{\frac{1}{2}}$$

with resultant $\Delta D_0$ characterized in that $$D_0 < D_1, D_2, D_3, D_4, D_5, D_6$$

As a result, this color distance is a minimum, and purple is then recognized as the color of the aforementioned position "⓪".

In the following, the procedure for evaluating base recognition data will be explained in detail according to the procedure shown in the flow chart of FIG. 13.

For example, as shown in FIG. 14, the color code is actually printed onto the substrate (for example, a white sheet of paper) using the inks of yellow, magenta, cyanogen, yellow+magenta, yellow+cyanogen, magenta+cyanogen and black. The values of a and b in the Lab color specification system are then calculated with regard to the color of the printed color code, and these values are then designated as the standard ($a_0$, $b_0$).

Figure 13:
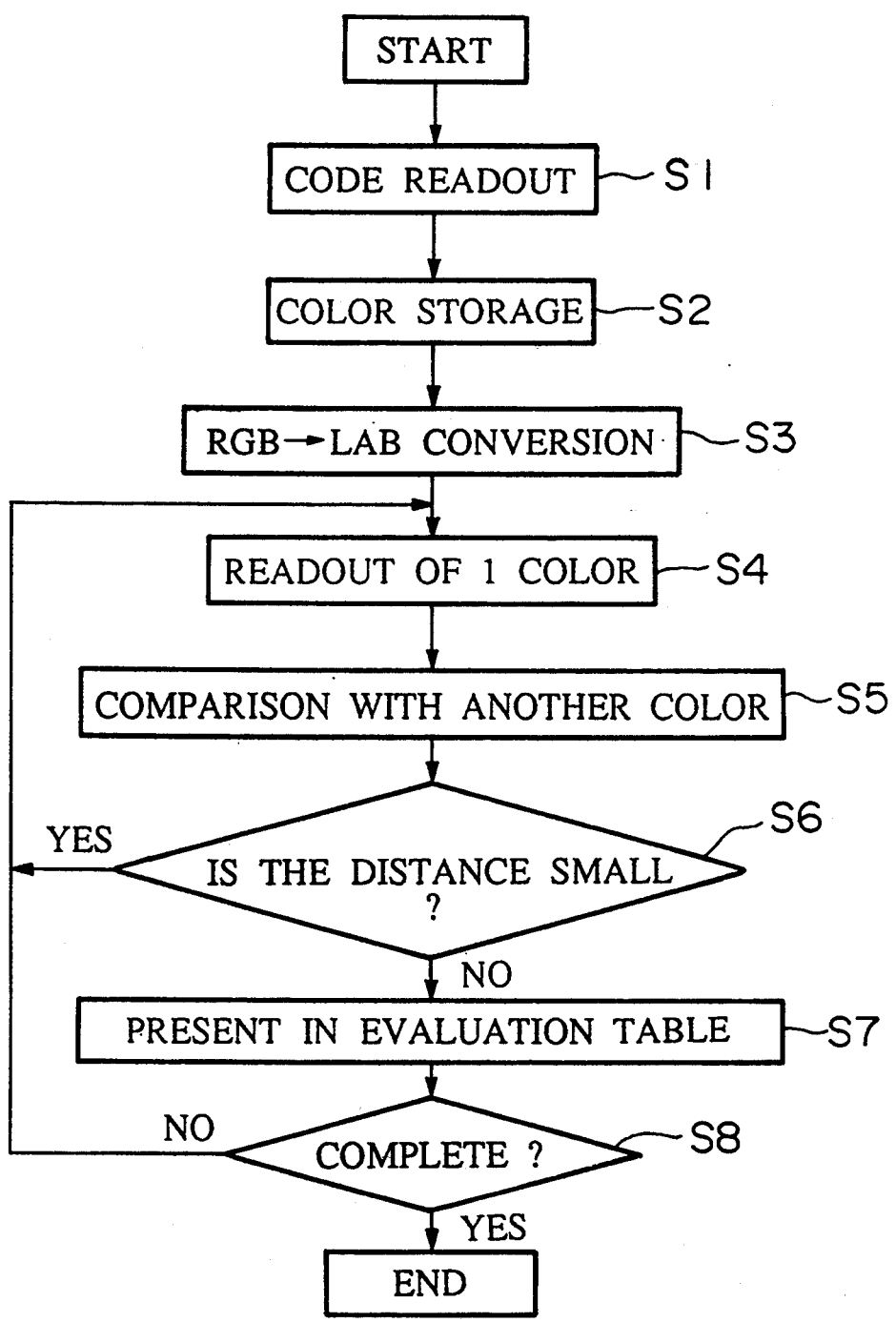
FIG. 13 is a flow chart showing a procedure for the evaluation of color phases.

In FIG. 13, readout of color code 1 is carried out as step S1. In other words, for example, the reflected or transmitted light from color code 1 is spectrally divided using an RGB filter and the XYZ excitation values are calculated.

The color is then stored in step S2. For example, the XYZ excitation values calculated in step S1 are stored into memory.

In step S3, RGB is converted into the Lab color specification system. In other words, the XYZ excitation values read out from memory are converted in the values for a and b of the Lab color specification system using the aforementioned formulae (1) and (2), and then stored into memory.

In step S4, one color is read out. Namely, one value each of a and b stored in memory in step S3 is read out.

In step S5, this color is compared with another color. In other words, the color read out in step S4 (the color possessing the values of a and b read out in step S4) is compared to a color previously read out and stored in evaluation table 8, and the color distance is calculated.

In step S6, a decision is made as to whether the color distance calculated in step S5 is smaller than a predetermined value. If it is determined that this color distance is small and that the color is already stored in evaluation table 8, a decision of YES results and the process returns to step S4 with regard to a next color.

On the other hand, if it is determined that the aforementioned color is not stored in evaluation table 8, a decision of NO results, and the color is then stored in evaluation table 8 in the step S7.

In step S8, a decision is made as to whether or not the process is completed. A YES result ends the process, while a NO result sends the process back to step S4 with regard to a next color.

In the above-mentioned manner, the colors from the color code printed onto white paper and the like are read out, the values of a and b of the Lab color specification system are calculated, and stored in evaluation table 8. These values of a and b stored in evaluation table 8 then serve as base recognition data $a_0$, $b_0$, and are used as the standard at the actual time of reading out the color code.

FIG. 14 shows an example of the colorimetric data (base recognition data) of various printing regions according to the present invention. This figure shows the colorimetric data and color distances for each set of colorimetric data $\Delta D$ calculated according to the procedure shown in FIG. 13.

To begin with, yellow, magenta, cyanogen and black water-color jet inks of the J1W series (produced by Dai Nippon Ink & Chemicals, Inc.) were printed in solid angular patterns onto a white sheet of paper using a commercially available ink jet printer according to the following 7 color specifications:

1. yellow
2. magenta
3. cyanogen
4. yellow+magenta
5. yellow+cyanogen
6. magenta+cyanogen
7. black Subsequently, using light source C as the irradiation light source, each color printing region was colormetrically measured by means of a solid image pick-up tube color camera possessing an RGB filter. The 3 XYZ excitation values obtained were then substituted into the aforementioned formulae (1) and (2), and the $a_0$ and $b_0$ values of each printing region in the Lab color specification system were calculated. These values were then used as base recognition data (standard data). For example, in the case of yellow, $a_0 = -7.37$ and $b_0 = 45.14$. In the same manner, the measurements of the other colors were also performed.

As shown in the right-hand side of FIG. 14, $$\Delta D = (a^2 + b^2)^{\frac{1}{2}}$$

wherein $$\Delta a = (a_m - a_n)$$

$$\Delta b = (b_m - b_n)$$

The minimum value among the calculated values of the color distances is then designated $\Delta D_{MIN}$. $\Delta D_{MIN}$ can also be calculated by the following formula:

$\Delta D_{MIN}$ = minimum value of $(\Delta a^2 + \Delta b^2)^{\frac{1}{2}}$ for each color printing region
= 21.4

Subsequently, when actually reading out the color code, a value, for instance 15, less than the minimum value of the color distance calculated above, $\Delta D_{MIN}=21.4$, with regard to all of the colors was determined. The conditions at the time of reading out the a and b values of the Lab color specification from the color code were then set according to the following formula:

$$((a-a_0)^2+(b-b_0)^2)^{\frac{1}{2}} < \text{circular range of 15}$$

Based on these conditions, at the time of reading out the colors from the color code, readout errors did not occur, and correct color readout was possible. This aforementioned readout procedure will be further explained hereafter using FIG. 16.

For the sake of comparison, readout of the colors of the color code was performed using the conditions displayed in the following formula.

$$((a-a_0)^2+(b-b_0)^2)^{\frac{1}{2}} < \text{circular range of 25}$$

The above conditions resulted in readout errors.

FIG. 15 shows an example of the colorimetric data (base recognition data) of various printing regions according to the present invention.

Each of the inks used was produced by combining 3% of a respective dye chosen from the list below, 5% of diethylene glycol with water as the remaining portion, agitating, and then filtering this mixture using a 0.5 μm membrane filter.

- direct yellow 132
- direct orange 15
- direct red 236
- direct red 238
- direct violet 51
- direct blue 1
- direct blue 199
- direct brown 44
- direct black 19

Using the aforementioned inks, 9 different angular patterns were printed by means of a commercially available ink jet printer.

The a and b values of each color printing region in the Lab color specification system were then calculated as shown in FIG. 14. Values for $a_0$ and $b_0$ were then assigned as shown in the left-hand side of the FIG. 15. For example, in the case of direct yellow 132, $a_0=-4.70$ and $b_0=47.76$.

In addition, the minimum value $\Delta D_{MIN}$ of $\Delta D=(a^2+b^2)^{\frac{1}{2}}$ was calculated to be 16.7. When this color code was actually read out, a value, for instance 10, that was less than the minimum value of the color distance calculated above, $\Delta D_{MIN}=16.7$, with regard to all of the colors was determined. The conditions at the time of actually reading out the a and b values of the Lab color specification from the color code were then set according to the following formula:

$$((a-a_0)^2+(b-b_0)^2)^{\frac{1}{2}} < \text{circular range of 10}$$

Figure 16:
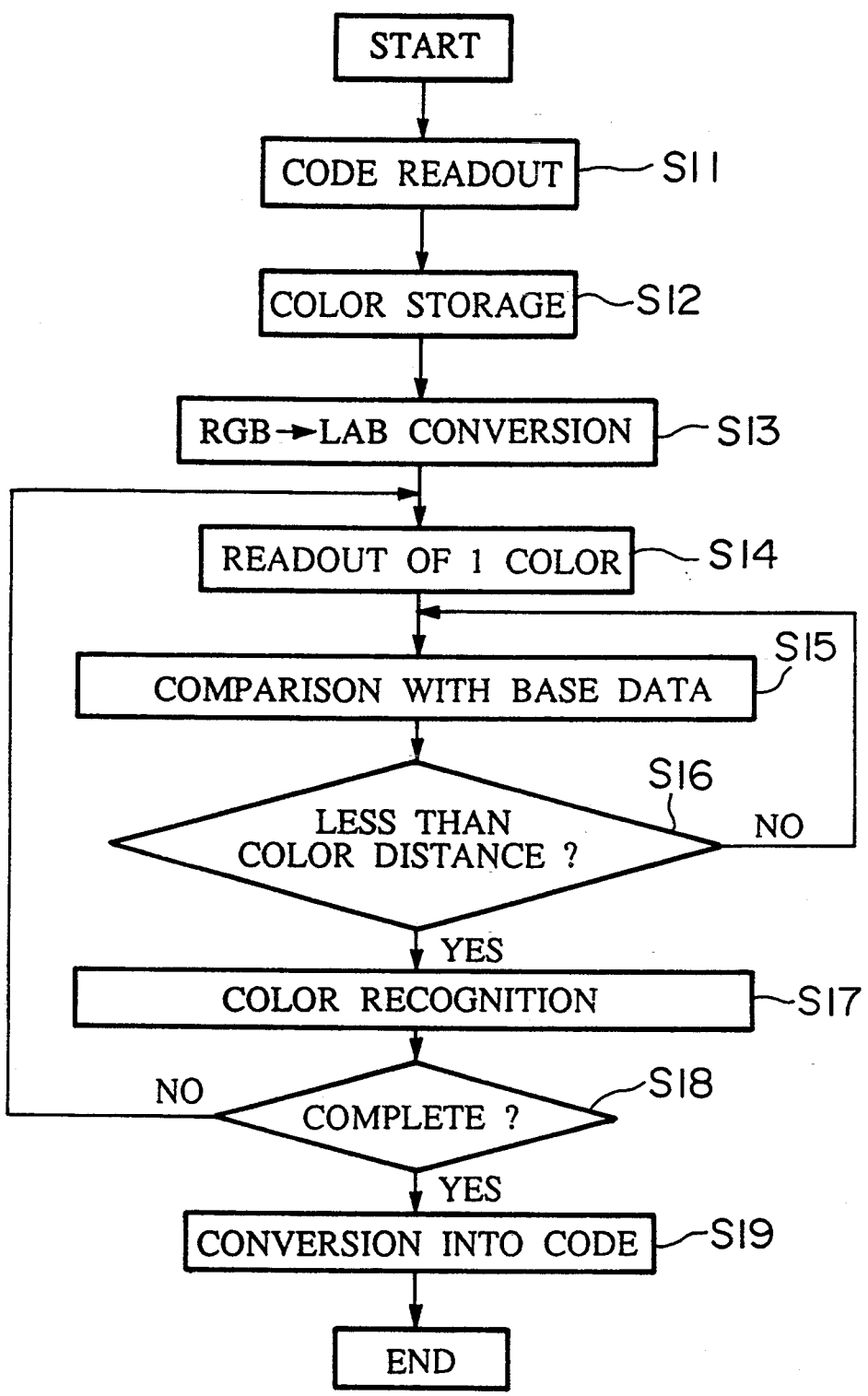
FIG. 16 shows a flow chart at the time of reading out a color code.

Based on these conditions, at the time of reading out the colors from the color code, readout errors did not occur, and correct color readout was possible (the readout procedure will be explained hereafter using FIG. 16).

Furthermore, readout errors were generated when readout of the colors of the color code was performed using the conditions displayed in the following formula.

$$((a-a_0)^2+(b-b_0)^2)^{\frac{1}{2}} < \text{circular range of 20}$$

The method for readout from the color code will be explained in detail according to the procedure shown by the flowchart in FIG. 16. In FIG. 16, readout of color code 1 is carried out as step S11. In other words, for example, the reflected or transmitted light from color code 1 is spectrally divided using an RGB filter, and the XYZ excitation values are calculated.

The color is then stored in step S12. For example, the XYZ excitation values calculated in step S11 are stored into memory.

In step S13, RGB is converted into the Lab color specification system. In other words, the XYZ excitation values read out from memory are converted into the values for a and b of the Lab color specification system using the aforementioned formulae (1) and (2), and then stored into memory.

In step S14, one color is read out. Namely, one value each of a and b stored in memory in step S13 is read out.

In step S15, this color is compared with a base data. In other words, the color read out in step S14 (the color possessing the values of a and b read out in step S14) is compared to a color previously read out and stored in the evaluation table, and the color distance $\Delta D$ is calculated using the following formula.

$$\Delta D=((a-a_0)^2+(b-b_0)^2)^{\frac{1}{2}}$$

In step S16, a decision is made as to whether the color distance $\Delta D$ calculated in step S15 is smaller than a predetermined value. If the above decision is YES, this color distance is smaller than a predetermined color distance (for example, the minimum value $\Delta D_{MIN}$ among the calculated values of the color distances $\Delta D$) and thus the color of the aforementioned region is recognized in the step S17 and the process moves to step S18.

On the other hand, if the above decision is NO, a determination is made that the color distance $\Delta D$ calculated in step S15 is not smaller than a predetermined color distance, and the process returns to step S15 with regard to the next base data.

In step S18, a decision is made as to whether or not the process is completed. A YES result indicates that the procedure from step S15 to step S17 with regard to the color stored in memory has been completed, and this color is converted to a code in step S19 and the procedure of the readout is reached to the end. For example, in the preferred embodiment shown in FIG. 1, a pair of colors is converted into one code.

On the other hand, a NO result sends the process back to step S14 with regard to the subsequent color.

In the aforementioned manner, the color is read out from the color code printed onto the substrate, and the a and b values of the Lab color specification system are calculated. These values are then referenced with a previously recorded evaluation table, and the color distance with the $a_0$ and $b_0$ values of the base recognition data recorded in the aforementioned evaluation table are calculated. When this color distance is less than a predetermined distance, it is recognized as a color corresponding to the aforementioned range.

In other words, when the color distance ΔD between the a, b values of each color printing region and the $a_0$, $b_0$ values of the base recognition data (i.e. $((a-a_0)^2+(b-b_0)^2)^{\frac{1}{2}}$) are within the circular range of the minimum value $\Delta D_{MIN}$ of $(\Delta a^2+\Delta b^2)^{\frac{1}{2}}$ of each color printing region, the color read out is determined to be the color corresponding to the aforementioned range therein.

In principle, if ΔD is within the circular range of the minimum value $\Delta D_{MIN}$ of $(\Delta a^2+\Delta b^2)^{\frac{1}{2}}$ of each color printing region, recognition of the color can be performed, however due to shifts caused by irregular colors, color shifts, readout errors and exterior light sources, it is preferable to have a ΔD which is slightly smaller than the aforementioned minimum value $\Delta D_{MIN}$.

The color difference ΔE in the conventional Lab color specification system is easily affected by discoloration of the printed matter, resulting in the occurrence of recognition errors, however, the recognition method utilizing a color distance ΔD according to the present invention is not affected by similar influences, and thus superior recognition of a color can be performed.

ΔE is expressed by the following formula:

$$\Delta E=(\Delta L^2+\Delta a^2+\Delta b^2)^{\frac{1}{2}}$$

In addition, ideally, the most appropriate light source at the time of readout is a C-light source which is known as the standard light source: similarly, the color specification system of the present invention is a Lab color specification system. In addition, the formula for converting the color specification system can use a standard light source such as an A-light source, $D_{65}$-light source and the like, as well as solar light. As well, depending on the combination of colorants, fluorescent lights and other artificial light sources can also be used. These light sources can be used alone or in combinations.

Furthermore, lithography, relief-printing, gravure, electrophotography, heat-sensitive printing, ink jet printing, electrostatic storage and the like can be employed as the printing method. In particular, printing from distant positions is possible using the ink jet storage method, and since various coloring agents can be sprayed using this method, the jet ink compositions are appropriate as inks for use in the color code.

Method of Determination of the Print Color

The method for determining the print color of the color code will be explained in detail according to the procedure shown by the flow chart in FIG. 17. As shown in FIG. 18, for example, the inks of yellow, magenta, cyanogen, yellow+magenta, yellow+cyanogen, magenta+cyanogen, and black were printed onto white sheets of paper, and the a, b values of the Lab color specification system for the colors of these printed color codes were calculated. Colors with color distances ΔD greater than a predetermined value were determined to be print colors. This process is further explained below.

Figure 17:
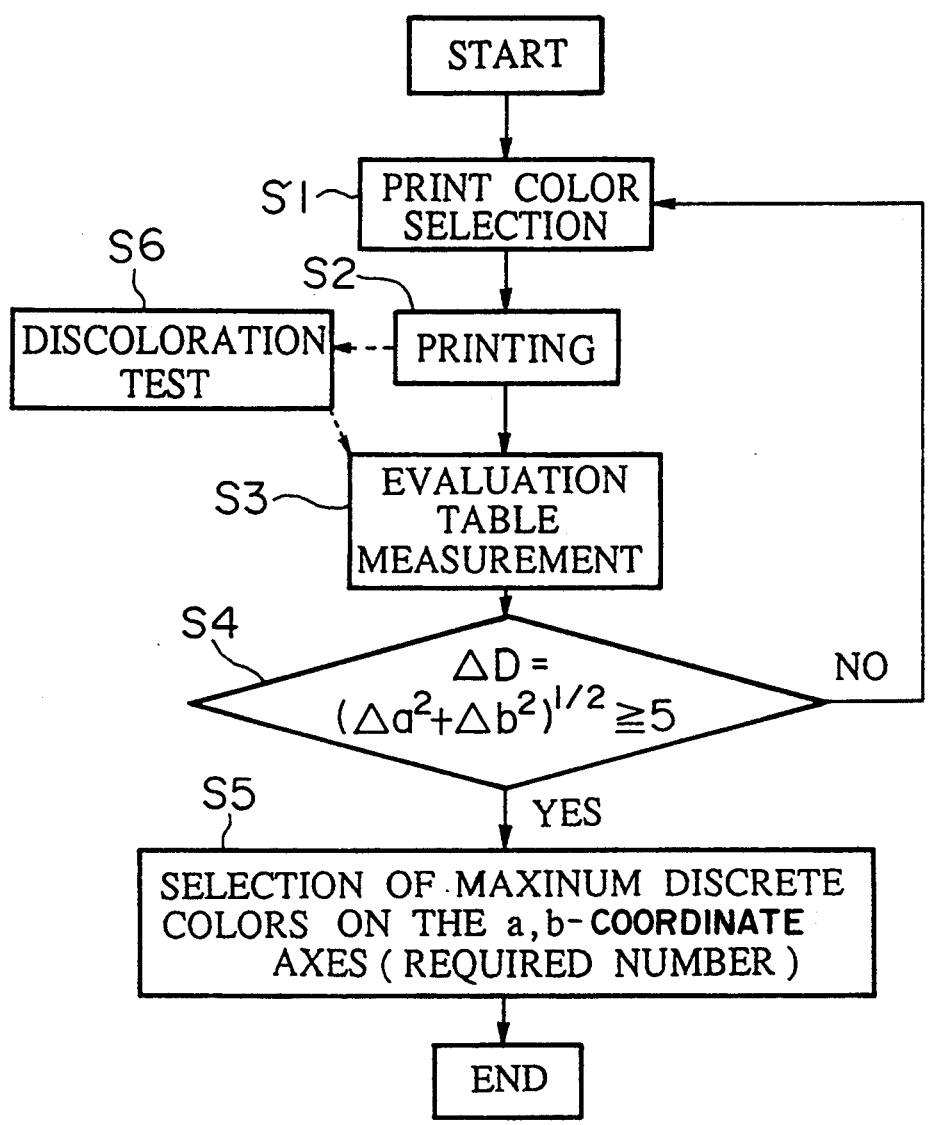
FIG. 17 is a flow chart for determining the print colors of the color codes.

In FIG. 17, selection of the print color is carried out in step S1. In other words, in order to determine the print color for printing the color code, a plurality of print color inks (coloring agents) are listed.

In step S2, printing is performed. In other words, the color code is printed, for example using a color ink jet printer, with the print color inks listed in step S1. Immediately after printing, print colors of the color code are selected in steps S3 through S5, and after conducting a discoloration test on the color code in step S6, print colors are again selected. In this manner, colors which fade with the passage of time are excluded from the print colors.

In step S3 the evaluation data is measured. In other words, the color code is read out by the readout apparatus 2 shown in FIG. 11, spectrally divided, and then converted into both amplified and digital values by means of signal amplifying digital converter 3. The XYZ excitation values of RGB are then inputted into computer 4. The color conversion processing unit 7 which forms computer 4 then substitutes the XYZ excitation values into the aforementioned formulae (1) and (2), and calculates the respective a, b values of the Lab color specification system. For example, the a, b values shown in FIG. 18 were calculated as the values on the a, b coordinate axes of FIG. 12. In the case of yellow (i.e. "2" in FIG. 18), a and b were calculated as shown below:

a = −7.37
b = 45.14

In addition, the a, b values for the color code produced after conducting the discoloration test in step S6 were calculated as shown in FIG. 18.

In step S4, it is determined whether or not the color distance ΔD (i.e. $(\Delta a^2+\Delta b^2)^{\frac{1}{2}}$) is greater than 5. In other words, based on the a and b values of a color calculated in step S3, the color distance ΔD with another color is calculated, and a decision is made as to whether or not this color distance ΔD is greater than 5 (arbitrary value calculated in the experiment). In the case when this decision is YES, the process moves to step S5. On the other hand, when the above decision is NO, the color distance is small, and the color is determined to be inappropriate for use as a print color of the color code. Thus, the process selects the next color and returns to step S1.

Step S5 selects the required number of maximum discrete colors on the a,b-coordinate axes. Namely, with a YES decision in step S4, colors with color distances ΔD of less than 5 have been determined as inappropriate as print colors and removed, thus in step S5 the required number of maximum discrete colors are selected from the remaining colors which results in determination of the print colors. In this case, the colors are considered both before and after the discoloration test of step S6, with colors satisfying both the conditions of step S4 and step S5 being selected and determined as print colors.

In the above-mentioned manner, the a, b values of the Lab color specification system for the plurality of colors comprising the printed color code are calculated both immediately after printing, and after the discoloration test. The color distances ΔD for each color are calculated, and when these color distances ΔD exceed a predetermined value and are maximum discrete colors, the required number of these color are determined as print colors. As a result, when the color code is printed using the designated print colors and read out, it is possible to determine print colors which are also maximum discrete colors and possess maximum color distances ΔD. Moreover, even when, for example, these print colors are discolored or faded, they still serve as maximum discrete colors and possess maximum color distances ΔD.

The present invention, in order to calculate the color distances ΔD, applies the a, b values of the Lab color specification system. In other words, although the color difference ΔE in the conventional Lab color specification system is easily affected by discoloration and is inappropriate for the color code of the present invention, according to this process, inappropriate colors are excluded thus preventing unnecessary actions. In this manner, it is possible to maintain, using the results of the discoloration test in FIG. 18 (to be explained hereafter), a sufficiently large color distance ΔD even when, for example, the color code is discolored, which results in the precise and correct readout of codes from this color code.

FIG. 18 shows examples of colorimetric data of various color printing regions according to the present invention. FIG. 19 shows examples of color distances between each color printing region according to the present invention. FIG. 20 shows examples of color distances between each color printing region after discoloration according to the present invention. In other words, these figures show examples of the colorimetric data and color distances (before and after discoloration) calculated according to the procedure shown in FIG. 17. These results will be explained below.

Yellow, magenta, cyanogen and black water-color jet inks of the J1W series (produced by Dai Nippon Ink & Chemicals, Inc.) were printed in solid, angular patterns onto a white-colored substrate using a commercially available ink jet printer according to the following 8 color specifications:

1. white cloth (prior to printing)
2. yellow
3. magenta
4. cyanogen
5. yellow+magenta
6. yellow+cyanogen
7. magenta+cyanogen
8. black Subsequently, using a C-light source as the irradiation light source, each color printing region was colormetrically measured by means of a solid image pick-up tube color camera possessing an RGB filter. The 3 XYZ excitation values obtained were then substituted into the aforementioned formulae (1) and (2), and the a, b values of each printing region in the Lab color specification system, before (immediately after printing) and after discoloration, were calculated as shown in FIG. 18. The values for the other colors were calculated in the same manner, as shown in the figure.

The color distances ΔD were then calculated, as shown below, and the results are shown in FIG. 19 (before discoloration) and FIG. 20 (after discoloration).

$$\Delta D = (a^2 + b^2)^{\frac{1}{2}}$$

wherein $$\Delta a = (am - an)$$

$$\Delta b = (bm - bn)$$

All of the color distances ΔD of the colors, before and after discoloration, calculated in the above manner can be expressed by and also satisfy the conditions of the following formula.

$$\Delta D = (a^2 + b^2)^{\frac{1}{2}} > 5$$

In this manner, the print colors of the color code are determined.

Furthermore, the colorimetric data following discoloration shown in FIG. 18 was obtained by measuring each printing region after irradiating light from a xenon lamp without a UV filter for 10 hours (equivalent to 6 months of exposure under indoor fluorescent lighting).

When a color code was printed by means of an ink jet printer using the print colors determined in the above-mentioned manner, correct readout of all colors was possible using the system shown in FIG. 11.

FIG. 21 shows examples of colorimetric data of various color printing regions according to the present invention, while FIG. 22 shows examples of color distances between each of these color printing regions according to the present invention. Namely, these figures show examples of the colorimetric data and color distances calculated according to the procedure shown in FIG. 17. These results will be explained below.

Each of the 10 inks shown in FIG. 21 was produced by combining 3% of a respective dye, 5% of diethylene glycol with water as the remaining portion, agitating, and then filtering this mixture using a 0.5 μm membrane filter. These inks were then printed onto white sheets of paper in solid, angular patterns using a commercially available ink jet printer.

Subsequently, using a C-light source as the irradiation light source, each color printing region was colormetrically measured by means of a solid image pick-up tube color camera possessing an RGB filter. The 3 XYZ excitation values obtained were then substituted into the aforementioned formulae (1) and (2), and the a, b values of each printing region in the Lab color specification system were calculated as shown in FIG. 21. The values for the other colors were calculated in the same manner, as shown in the figure.

The color distances ΔD were then calculated, as shown below, and the results are shown in FIG. 22.

$$\Delta D = (a^2 + b^2)^{\frac{1}{2}}$$

wherein $$\Delta a = (am - an)$$

$$\Delta b = (bm - bn)$$

Combinations possessing color distances, calculated in the above-mentioned manner, that do not satisfy the following formula include No. 5 (direct red 255) and No. 6 (direct red 236), and No. 9 (direct blue 1) and No. 10 (direct blue 15).

$$\Delta D = (a^2 + b^2)^{178} \geq 5$$

Consequently, the dyes of 8 colors excluding No. 5 (direct red 255) and No. 10 (direct blue 15) were determined to be print colors.

When a color code was printed by means of an ink jet printer using the print colors determined in the above-mentioned manner, correct readout of all colors was possible using the system shown in FIG. 11.

The printing ink and/or colorant for the ink composition determined according to the present invention, can be selected from conventional dyes and pigments.

Examples of conventional printing inks employing pigments include the following:

C.I. pigment yellow 1, 2, 3, 4, 5, 6, 7, 10, 11, 12, 13, 14, 15, 16, 17, 23, 65, 73, 83;

C.I. pigment orange 1, 2, 5, 13, 14, 15, 16, 17, 24, 31;

C.I. pigment red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48, 49, 50, 51, 52, 53, 54, 55, 57, 58, 60, 63, 64, 68, 81, 83, 87, 88, 89, 90, 112, 114, 122, 123, 163;
C.I. pigment violet 1, 2, 3, 5, 19, 23;
C.I. pigment blue 1, 2, 3, 15, 16, 17, 22, 25;
C.I. pigment green 1, 2, 7, 8, 10, 12, 36, 37, 38; and
C.I. pigment brown 1, 2, 5.

In the case of the ink for used in the ink jet method, it is preferred that besides the aforementioned pigments, a dye with a superior stability at the time of dissolving be employed. In the case of a water-color ink, the dye can be appropriately selected from the group consisting of acidic dyes, basic dyes, direct dyes, reactive dyes, disperse dyes, food colorants and the like. In the case of an oily ink, various types of oily dyes can be selected.

Concretely, as the acidic dye, the following can be listed.

C.I. acid black 1, 2, 7, 16, 17, 24, 26, 28, 31, 41, 48, 52, 58, 60, 63, 94, 107, 109, 112, 118, 119, 121, 122, 131, 155, 156;
C.I. acid yellow 1, 3, 4, 7, 11, 12, 13, 14, 17, 18, 19, 23, 25, 29, 34, 36, 38, 40, 41, 42, 44, 49, 53, 55, 59, 61, 71, 72, 76, 78, 79, 99, 111, 114, 116, 122, 135, 142, 161, 172;
C.I. acid orange 7, 8, 10, 19, 20, 24, 28, 33, 41, 45, 51, 56, 64;
C.I. acid red 1, 4, 6, 8, 13, 14, 15, 18, 19, 21, 26, 27, 30, 32, 34, 35, 37, 40, 42, 51, 52, 54, 57, 80, 82, 83, 85, 87, 88, 89, 92, 94, 97, 106, 108, 110, 111, 114, 115, 119, 129, 131, 133, 134, 135, 143, 144, 152, 154, 155, 172, 176, 180, 184, 186, 187, 249, 254, 256, 289, 317, 318;
C.I. acid violet 7, 11, 15, 34, 35, 41, 43, 49, 51, 75;
C.I. acid blue 1, 7, 9, 15, 22, 23, 25, 27, 29, 40, 41, 43, 45, 49, 51, 53, 55, 56, 59, 62, 78, 80, 81, 83, 90, 92, 93, 102, 104, 111, 113, 117, 120, 124, 126, 138, 145, 167, 171, 175, 183, 229, 234, 236, 249;
C.I. acid green 3, 9, 12, 16, 19, 20, 25, 27, 41, 44; and
C.I. acid brown 4, 14.

As the basic dye, the following can be listed.
C.I. basic black 2, 8;
C.I. basic yellow 1, 2, 11, 12, 14, 21, 32, 36;
C.I. basic orange 2, 15, 21, 22;
C.I. basic red 1, 2, 9, 12, 13, 37;
C.I. basic violet 1, 3, 7, 10, 14;
C.I. basic blue 1, 3, 5, 7, 9, 24, 25, 26, 28, 29;
C.I. basic green 1, 4; and
C.I. basic brown 1, 12.

As the direct dye, the following can be listed.
C.I. direct black 2, 4, 9, 11, 14, 17, 19, 22, 27, 32, 36, 38, 41, 48, 49, 51, 56, 62, 71, 74, 75, 77, 78, 80, 105, 106, 107, 108, 112, 113, 117, 132, 146, 154, 168, 171, 194;
C.I. direct yellow 1, 2, 4, 8, 11, 12, 24, 26, 27, 28, 33, 34, 41, 42, 44, 48, 50, 51, 58, 72, 85, 86, 87, 88, 98, 100, 110, 127, 135, 141, 142, 144;
C.I. direct orange 6, 8, 10, 26, 29, 41, 49, 51, 102;
C.I. direct red 1, 2, 4, 8, 9, 11, 13, 15, 17, 20, 23, 24, 28, 31, 33, 37, 39, 44, 46, 47, 48, 51, 59, 62, 63, 73, 75, 77, 80, 81, 83, 84, 85, 87, 89, 90, 94, 95, 99, 101, 108, 110, 145, 189, 197, 220, 224, 225, 226, 227, 230, 250, 254, 256, 257;
C.I. direct violet 1, 7, 9, 12, 35, 48, 51, 90, 94;
C.I. direct blue 1, 2, 6, 8, 15, 22, 25, 34, 69, 70, 71, 72, 75, 76, 78, 80, 81, 82, 83, 86, 90, 98, 106, 108, 110, 120, 123, 158, 163, 165, 192, 193, 194, 195, 196, 199, 200, 201, 202, 203, 207, 218, 236, 237, 239, 246, 258, 287;
C.I. direct green 1, 6, 8, 28, 33, 37, 63, 64; and
C.I. direct brown 1A, 2, 6, 25, 27, 44, 58, 95, 100, 101, 106, 112, 173, 194, 195, 209, 210, 211.

As the reactive dye, the following can be listed.

C.I. reactive black 1, 3, 5, 6, 8, 12, 14;
C.I. reactive yellow 1, 2, 3, 13, 14, 15, 17;
C.I. reactive orange 2, 5, 7, 16, 20, 24;
C.I. reactive red 6, 7, 11, 12, 15, 17, 21, 23, 24, 35, 36, 42, 63, 66, 84, 184;
C.I. reactive violet 2, 4, 5, 8, 9;
C.I. reactive blue 2, 5, 7, 12, 13, 14, 15, 17, 18, 19, 20, 21, 25, 27, 28, 37, 38, 40, 41;
C.I. reactive green 5, 7; and
C.I. reactive brown 1, 7, 16.

As the food colorant, the following can be listed.
C.I. food black 1, 2;
C.I. food yellow 2, 4, 5;
C.I. food red 2, 3, 7, 9, 14, 52, 87, 92, 94, 102, 104, 105, 106;
C.I. food violet 2;
C.I. food blue 1, 2; and
C.I. food 2, 3.

As the oily dye, the following can be listed.
C.I. solvent black 22, 23, 27, 29, 34, 43, 47, 123;
C.I. solvent yellow 19, 21, 32, 61, 79, 80, 81, 82;
C.I. solvent red 8, 35, 83, 84, 100, 109, 118, 119, 121, 122, 160; and
C.I. solvent blue 25, 55, 70.

The colorant is not in particular limited to the above-mentioned and can be used alone or in multiple combinations. In addition, the amount incorporated into the ink composition is preferably within the range of 0.1 to 20% by weight.

When employing at the same time a colorant which is heavily affected by discoloration with one that is not, readout errors occur due to this discoloration. Thus it is necessary to select colorants which display similar levels of discoloration.

Other ink components include solvents, resins, plasticizers, filler dyes, anti-corrosive agents and various other types of additives.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A color code for displaying information using an arranged combination of a plurality of color phase marks wherein said color code comprises a plurality of column marks arranged at uniform intervals, and a plurality of color phase marks arranged around the periphery of each of said plurality of column marks using each of said plurality of column marks as a reference.

2. A color code according to claim 1 wherein each color phase mark of said plurality of color phase marks is arranged at a predetermined distance from the column mark serving as a reference therein, and forming a predetermined angle with respect to the baseline joining said column mark and a subsequent column mark.

3. A color code according to claim 2 wherein said plurality of color phase marks are arranged sequentially such that a combination of two color phases corresponds to a code preset into a color code table.

4. A color code according to claim 3 wherein said column mark comprises one type of color phase, and said color phase mark comprises a combination of two color phases selected from among at least three types of color phases.

5. A color code according to claim 4 wherein said plurality of column marks are arranged in a straight line.

6. A color code according to claim 4 wherein said plurality of column marks are arranged at the corners of a polygon.

7. A color code according to one of claims 1 to 6 wherein said color code is printed onto a linen product.

* * * * *